US009521077B2

(12) United States Patent
Carames et al.

(10) Patent No.: US 9,521,077 B2
(45) Date of Patent: Dec. 13, 2016

(54) NETWORK CONNECTION VIA A PROXY DEVICE USING A GENERIC ACCESS POINT NAME

(71) Applicants: Cellco Partnership, Basking Ridge, NJ (US); Verizon Patent and Licensing Inc., Basking Ridge, NJ (US)

(72) Inventors: Miguel A. Carames, Martinez, CA (US); Arvind Aggarwal, Danville, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 407 days.

(21) Appl. No.: 13/947,382

(22) Filed: Jul. 22, 2013

(65) Prior Publication Data

US 2015/0023350 A1   Jan. 22, 2015

(51) Int. Cl.
*H04W 48/00*   (2009.01)
*H04W 48/20*   (2009.01)
*H04L 12/741*  (2013.01)
*H04W 76/02*   (2009.01)

(52) U.S. Cl.
CPC ............ *H04L 45/74* (2013.01); *H04W 48/17* (2013.01); *H04W 48/20* (2013.01); *H04W 76/022* (2013.01)

(58) Field of Classification Search
None
See application file for complete search history.

(56) References Cited

U.S. PATENT DOCUMENTS

| 6,870,822 | B2* | 3/2005 | Balogh | H04L 45/00 370/332 |
| 7,496,066 | B2* | 2/2009 | Speltacker | H04W 8/12 370/328 |
| 7,640,023 | B2* | 12/2009 | Ma | H04W 28/08 455/450 |
| 7,644,163 | B2* | 1/2010 | Gustafsson | H04L 29/06 370/337 |
| 7,660,584 | B2* | 2/2010 | Maxwell | H04L 29/12047 370/331 |
| 7,761,913 | B2* | 7/2010 | Grandmaitre | H04L 63/08 726/12 |
| 8,326,955 | B2* | 12/2012 | Airo | H04W 28/18 709/220 |
| 8,553,647 | B2* | 10/2013 | Akhtar | H04W 36/0022 370/331 |
| 8,605,662 | B2* | 12/2013 | Shatzkamer | H04M 3/42246 370/329 |
| 8,605,672 | B2* | 12/2013 | Durand | H04M 15/00 370/329 |

(Continued)

Primary Examiner — Gregory Sefcheck (57) ABSTRACT

A system may receive, based on a generic access point name stored by a user device, a request to establish a network connection. The request may include a user device identifier that identifies the user device. The system may determine, based on the user device identifier, a specific access point name associated with the user device. The specific access point name may be different from the generic access point name. The system may determine, based on the specific access point name, information that identifies a gateway node for processing traffic associated with the user device. The system may cause the network connection to be established based on the user device identifier and the information that identifies the gateway node.

20 Claims, 8 Drawing Sheets

(56) References Cited

U.S. PATENT DOCUMENTS

| | | | | |
|---|---|---|---|---|
| 8,621,555 B2* | 12/2013 | Zhou | H04L 12/14 | 726/1 |
| 8,750,863 B2* | 6/2014 | Shah | H04W 48/17 | 455/432.1 |
| 8,761,107 B2* | 6/2014 | Jin | H04L 5/0091 | 370/329 |
| 8,787,875 B2* | 7/2014 | Ahmed | H04L 12/66 | 455/410 |
| 8,805,365 B2* | 8/2014 | Heckman | H04W 60/00 | 455/435.1 |
| 8,914,025 B2* | 12/2014 | Mathias | G06Q 30/06 | 370/310 |
| 8,934,409 B2* | 1/2015 | Neil | H04W 76/022 | 370/232 |
| 9,055,554 B2* | 6/2015 | Shaw | H04W 76/00 | |
| 9,119,016 B2* | 8/2015 | Durand | H04M 15/00 | |
| 9,198,021 B2* | 11/2015 | Tomici | H04W 8/082 | |
| 9,220,110 B2* | 12/2015 | Rune | H04L 29/12066 | |
| 9,313,732 B2* | 4/2016 | Shaw | H04W 48/17 | |
| 9,351,234 B2* | 5/2016 | Ramle | H04W 48/17 | |
| 9,402,175 B2* | 7/2016 | Shah | H04W 48/17 | |
| 2006/0268835 A1* | 11/2006 | Hyotylainen | H04L 67/14 | 370/352 |
| 2008/0175178 A1* | 7/2008 | Patin | H04L 29/12188 | 370/310 |
| 2008/0232292 A1* | 9/2008 | Zhang | H04W 76/002 | 370/312 |
| 2009/0047947 A1* | 2/2009 | Giaretta | H04W 48/17 | 455/432.1 |
| 2011/0235546 A1* | 9/2011 | Horn | H04L 12/66 | 370/254 |
| 2012/0057576 A1* | 3/2012 | Neil | H04W 88/08 | 370/338 |
| 2012/0190331 A1* | 7/2012 | Ahmed | H04L 12/66 | 455/410 |
| 2013/0005320 A1* | 1/2013 | Li | H04W 76/022 | 455/418 |
| 2013/0005332 A1* | 1/2013 | Sedlacek | H04W 12/06 | 455/426.1 |
| 2014/0146806 A1* | 5/2014 | Liu | H04W 8/04 | 370/338 |
| 2015/0282026 A1* | 10/2015 | Gupta | H04L 5/0057 | 370/331 |

* cited by examiner

NETWORK CONNECTION VIA A PROXY DEVICE USING A GENERIC ACCESS POINT NAME

BACKGROUND

A user device may attempt to connect to a network using an access point name. The user device may provide an access point name to a network device (e.g., a gateway device) associated with the network. The network device may verify whether the access point name, requested by the user device, is included in a user profile associated with the user device.

DETAILED DESCRIPTION

The following detailed description of example implementations refers to the accompanying drawings. The same reference numbers in different drawings may identify the same or similar elements.

A service provider may wish to differentiate traffic flows associated with user devices of different network subscribers. For example, the service provider may wish to differentiate the traffic flows to apply different quality of service treatment, different billing treatment, different network access, etc. To provide differentiated treatment, the service provider may provide specific access point names (APNs) to different user devices. When a user device attempts to access a network, traffic from the user device may be routed and/or handled based on the specific APN. However, differentiating traffic in this manner may require extensive provisioning work, and may cause the service provider to deny service to the user device if the specific APN stored by the user device has not been updated. Implementations described herein may allow a service provider to differentiate treatment of multiple user devices, where the multiple user devices store the same generic APN.

Figure 1:
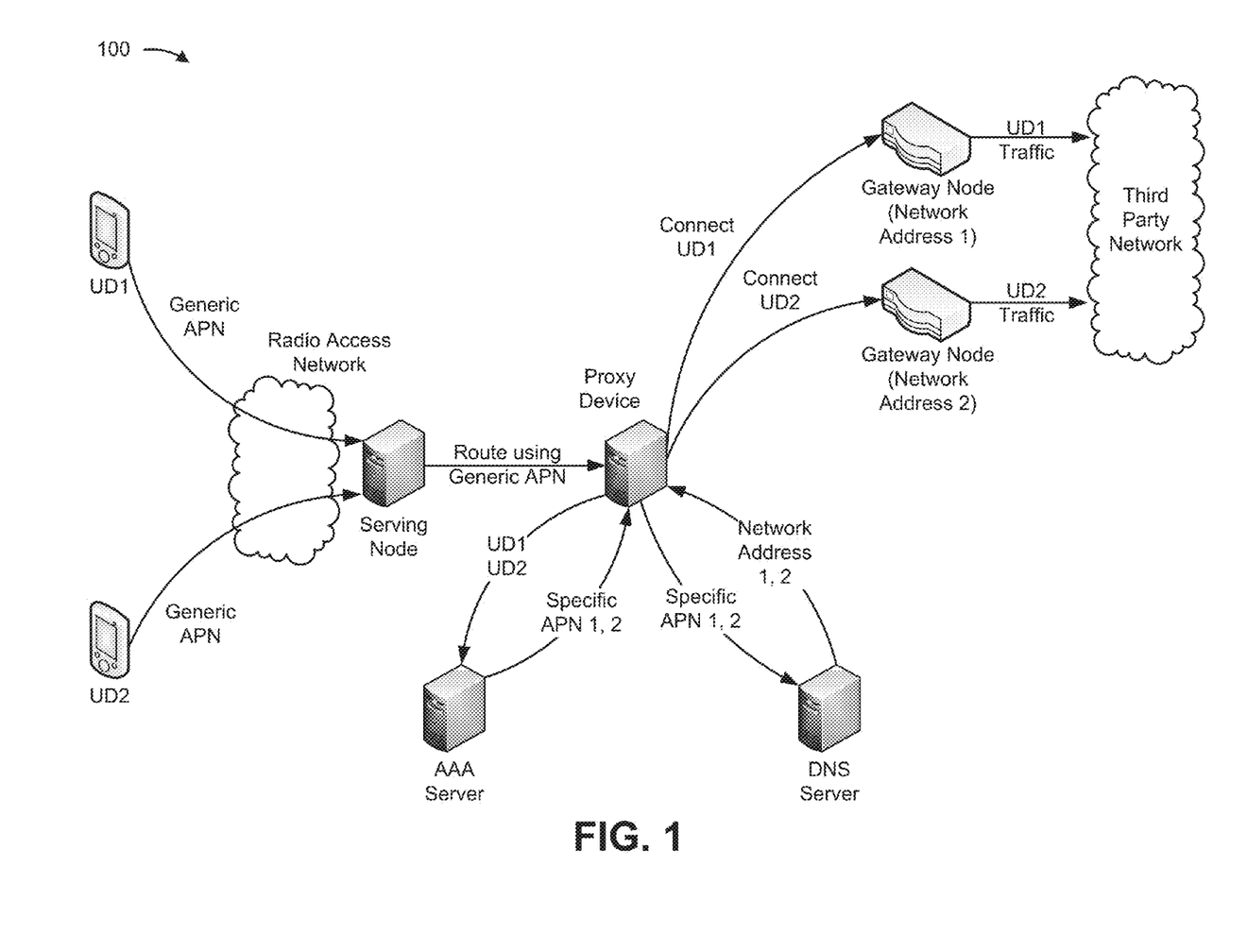
FIG. 1 is a diagram of an overview of an example implementation described herein.

FIG. 1 is a diagram of an overview of an example implementation 100 described herein. For the purpose of FIG. 1, assume that two user devices wish to communicate with a third party network via a service provider network. Further, assume that the two user devices are to connect to two different gateway nodes, associated with the service provider network, that may route traffic, associated with each user device, to the third party network. Finally, assume that each user device stores information that identifies the same generic APN associated with the service provider network.

As shown in FIG. 1, each of the two user devices may send a connection request, including the same generic APN, to a serving node (e.g., via a radio access network) associated with the service provider network. Each of the connection requests may also include a different user device identifier associated with each of the user devices. As shown, the serving node may determine a proxy device, associated with the two user devices, based on the generic APN, and the serving node may forward the connection requests to the proxy device. As further shown, the proxy device may receive the connection requests, and may determine, based on each user device identifier, a different specific APN associated with each user device. As further shown, the proxy device may determine, based on the two different specific APNs, two respective network addresses associated with two respective gateway nodes that are to process the traffic associated with the two respective user devices.

As further shown in FIG. 1, the proxy device may cause a connection (e.g., a connection between each user device and the gateway node that corresponds to each user device) to be established based on the network address of each gateway node. As further shown, traffic associated with each user device may be processed by the corresponding gateway node, and may be routed to the third party network. In this way, a user device may communicate with a third party network, via a service provider network, based on a generic APN (e.g., without relying on specific APN information provided by the user device).

Figure 2:
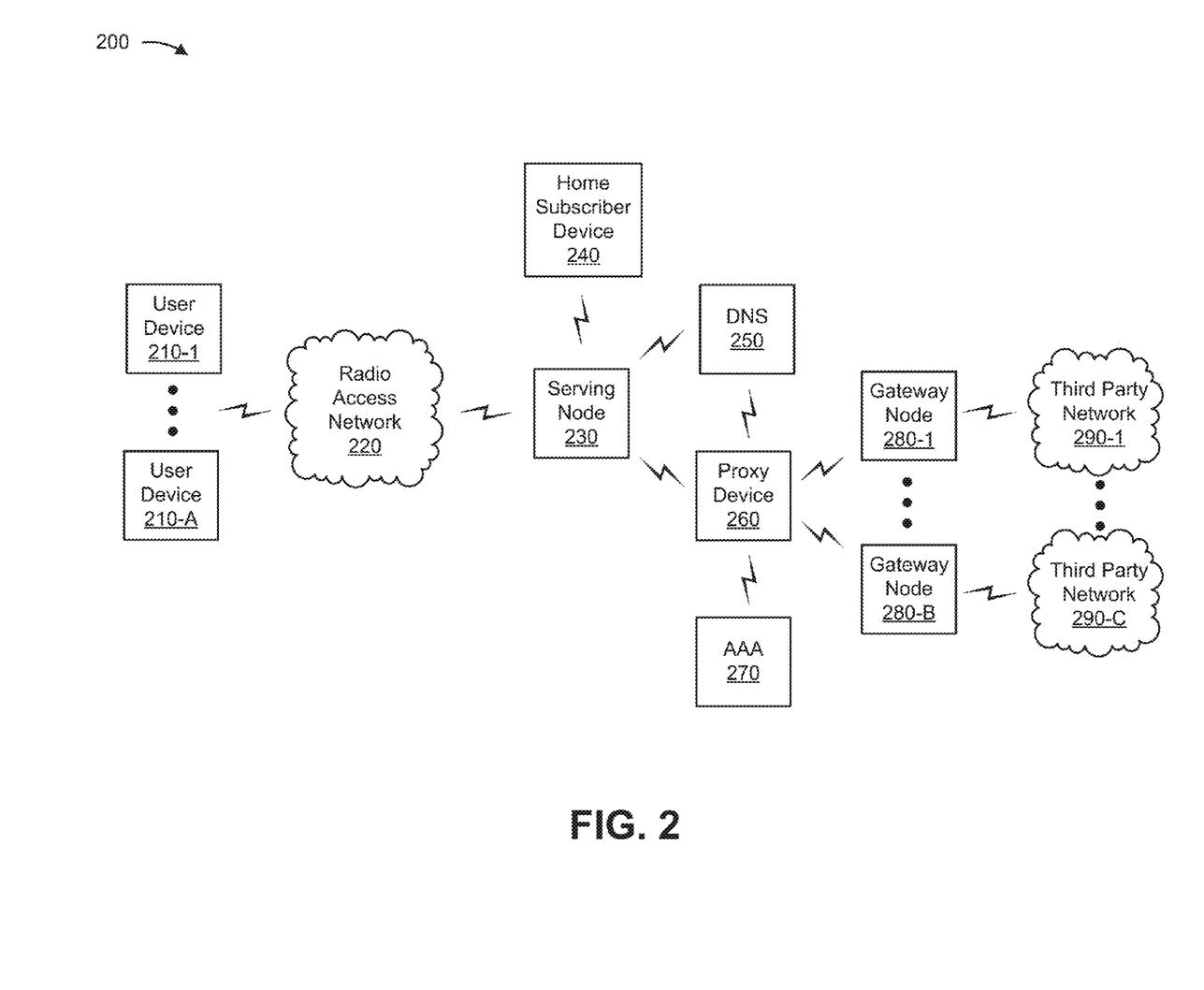
FIG. 2 is a diagram of an example environment in which systems and/or methods, described herein, may be implemented.

FIG. 2 is a diagram of an example environment 200 in which systems and/or methods described herein may be implemented. As shown in FIG. 2, environment 200 may include a set of user devices 210-1 through 210-A (A≥1) (hereinafter collectively referred to as "user devices 210," and individually as "user device 210"), a radio access network 220, a serving node 230, a home subscriber device 240, a domain name system ("DNS") server 250 (hereinafter referred to as "DNS server 250"), a proxy device 260, an authentication, authorization, and accounting ("AAA") server 270 (hereinafter referred to as "AAA server 270"), a set of gateway nodes 280-1 through 280-B (B≥1) (hereinafter collectively referred to as "gateway nodes 280," and individually as "gateway node 280"), and a set of third party networks 290-1 through 290-C (C≥1) (hereinafter collectively referred to as "third party networks 290," and individually as "third party network 290").

User device 210 may include a device capable of communicating with third party network 290 via gateway node 280, proxy device 260, serving node 230, and/or radio access network 220. For example, user device 210 may include a wired communication device, a wireless communication device, a radiotelephone, a personal communications system ("PCS") terminal (e.g., that may combine a cellular radiotelephone with data processing and data communications capabilities), a personal digital assistant ("PDA") (e.g., that can include a radiotelephone, a pager, Internet/intranet access, etc.), a smart phone, a desktop computer, a laptop computer, a tablet computer, and/or a similar device. In some implementations, user device 210 may store information that identifies a generic APN, and user device 210 may provide the information to another device (e.g., serving node 230) via radio access network 220. Multiple user devices 210 may store the same generic APN that provides access to different network devices (e.g., different gateway nodes 280).

Radio access network 220 may include an air interface and radio access technology associated with a cellular network (e.g., a global system for mobile communications ("GSM") network, a universal mobile telecommunications system network ("UMTS"), etc.). For example, radio access network 220 may include a GSM Enhanced Data rates for Global Evolution radio access network ("GERAN"), a UMTS terrestrial radio access network ("UTRAN"), an evolved UMTS terrestrial radio access network ("E-UTRAN"), or the like. In some implementations, radio access network 220 may allow user device 210 to communicate with another device (e.g., serving node 230, proxy device 260, gateway node 280, etc.) and/or another network (e.g., third party network 290).

Serving node 230 may include a device capable of routing user traffic. For example, serving node 230 may include one or more data processing and/or traffic transfer devices, such as a gateway, a router, a modem, a switch, a firewall, a network interface card ("NIC"), a hub, a bridge, a server, an optical add/drop multiplexer ("OADM"), or any other type of device that processes and/or transfers traffic. Additionally, or alternatively, serving node 230 may include a device (e.g., a server) capable of managing authentication, activation, deactivation, and mobility functions associated with user device 210. In some implementations, serving node 230 may include a serving gateway ("SGW"), a mobility management entity ("MME"), a serving general packet radio service ("GPRS") support node ("SGSN"), or the like. In some implementations, serving node 230 may receive, process, determine, and/or send information associated with a connection between user device 210, proxy device 260, and/or gateway node 280.

Home subscriber device 240 may include one or more devices, such as one or more server devices, capable of managing subscription and/or other information associated with user device 210. For example, home subscriber device 240 may receive, store, and/or provide profile information associated with user device 210 that identifies a generic APN that is permitted for use by and/or is accessible by user device 210, information associated with a user of user device 210, subscription information, rate information, minutes allowed, bandwidth allocation policy information, and/or other information. In some implementations, home subscriber device 240 may include a home subscriber server ("HSS"), and/or a home location register ("HLR").

DNS server 250 may include a one or more devices, such as one or more server devices, capable of providing a response to a query of a directory including one or more network addresses associated with one or more APNs. For example, DNS server 250 may include a device capable of determining, storing, receiving, and/or sending information that identifies a network address associated with proxy device 260 and/or gateway node 280.

Proxy device 260 may include a device capable of providing connectivity for user device 210 to a network (e.g., third party network 290). For example, proxy device 260 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, proxy device 260 may send, receive, and/or determine information associated with user device 210 and/or gateway node 280 (e.g., an APN, a network address, etc.). In some implementations, proxy device 260 may receive, send, and/or route traffic, associated with one or more user devices 210 to and/or from one or more gateway nodes 280. In some implementations, user traffic may be routed through proxy device 260. In some implementations, user traffic may not be routed through proxy device 260.

AAA server 270 may include one or more devices, such as one or more server devices, capable of managing subscription and/or other information associated with user device 210. For example, AAA server 270 may perform authentication, authorization, and/or accounting operations associated with a communication session associated with user device 210 and gateway node 280. In some implementations, AAA server 270 may include a device capable of sending, receiving, and/or storing information identifying user device 210, and/or information identifying a specific APN associated with user device 210.

Gateway node 280 may include a device capable of routing user data packets associated with an external network (e.g., third party network 290). For example, gateway node 280 may include one or more data processing and/or traffic transfer devices, such as a gateway, a router, a modem, a switch, a firewall, a NIC, a hub, a bridge, a server, an OADM, or any other type of device that processes and/or transfers traffic. In some implementations, gateway node 280 may include a packet data network gateway ("PGW"), a gateway GPRS support node ("GGSN"), or the like. In some implementations, gateway node 280 may receive, process, determine, and/or send information associated with a connection between user device 210, serving node 230, proxy device 260, and/or third party network 290. In some implementations, gateway node 280 may include a device associated with a specific APN (e.g., gateway node 280 may be assigned to process traffic associated with a specific APN). Different gateway nodes 280 may handle traffic differently, such as by providing different quality of service levels, by billing traffic differently, by providing access to different networks, or the like.

Third party network 290 may include one or more wired and/or wireless networks. For example, third party network 290 may include a cellular network, a public land mobile network ("PLMN"), a local area network ("LAN"), a wide area network ("WAN"), a metropolitan area network ("MAN"), an enterprise network, a telephone network, an ad hoc network, an intranet, the Internet, a fiber optic-based network, or a combination of these or other types of networks. In some implementations, user device 210 may communicate with third party network 290 via radio access network 220, serving node 230, proxy device 260, and/or gateway node 280. In some implementations, third party network 290 may provide traffic to user device 210 (e.g., traffic associated with an application server included in third party network 290).

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more of the devices shown in FIG. 2 may be implemented within a single device, or a single device shown in FIG. 2 may be implemented as multiple, distributed devices. Additionally, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
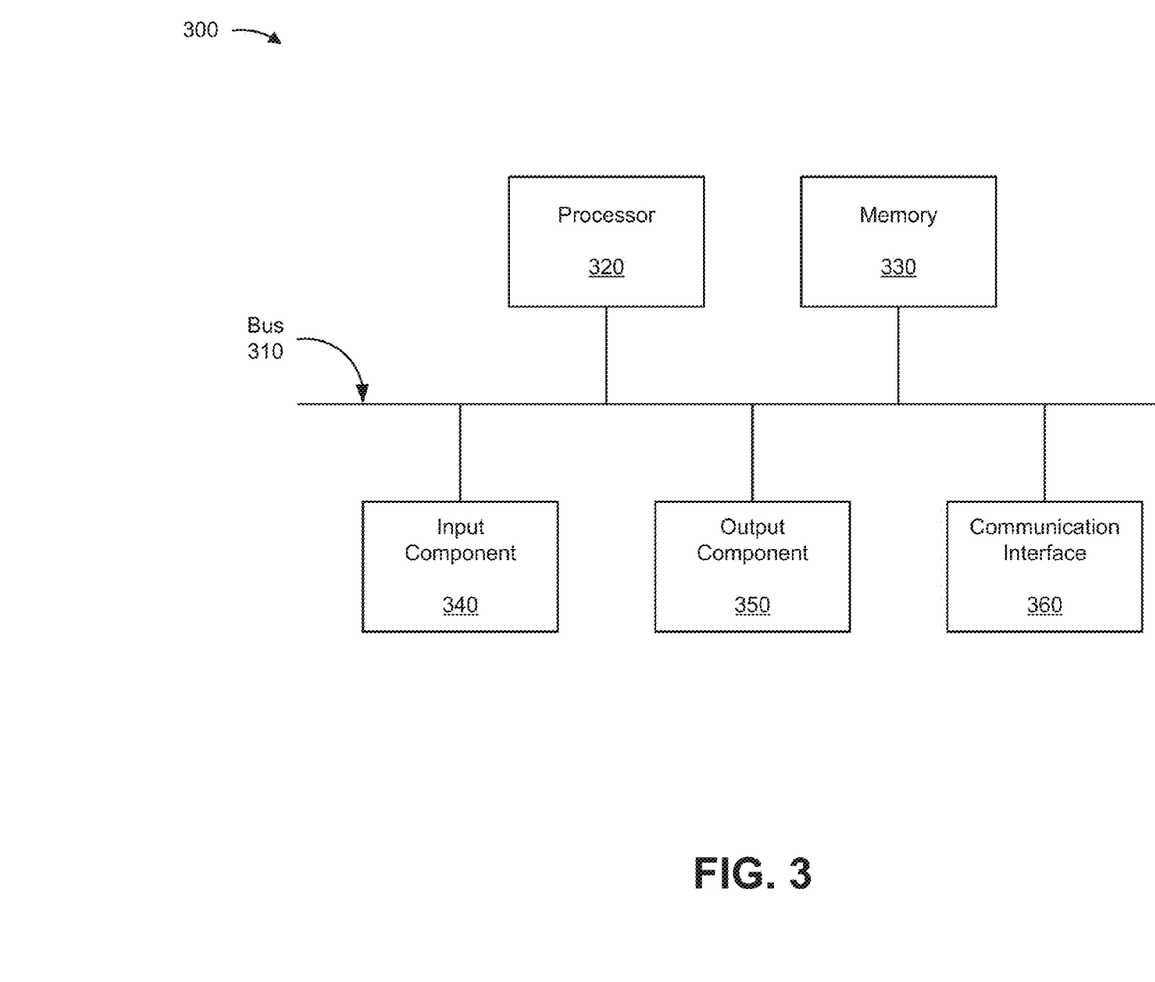
FIG. 3 is a diagram of example components of one or more devices of FIG. 2.

FIG. 3 is a diagram of example components of a device 300. Device 300 may correspond to user device 210, serving node 230, home subscriber device 240, DNS server 250, proxy device 260, AAA server 270, and/or gateway node 280. Additionally, or alternatively, user device 210, serving node 230, home subscriber device 240, DNS server 250, proxy device 260, AAA server 270, and/or gateway node 280 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor, a microprocessor, and/or any processing component (e.g., a field-programmable gate array ("FPGA"), an application-specific integrated circuit ("ASIC"), etc.) that interprets and/or executes instructions. In some implementations, processor 320 may include one or more processor cores. Memory 330 may include a random access memory ("RAM"), a read only memory ("ROM"), and/or any type of dynamic or static storage device (e.g., a flash memory, a magnetic memory, an optical memory, etc.) that stores information and/or instructions for use by processor 320.

Input component 340 may include any component that permits a user to input information to device 300 (e.g., a keyboard, a keypad, a mouse, a button, a switch, etc.). Output component 350 may include any component that outputs information from device 300 (e.g., a display, a speaker, one or more light-emitting diodes ("LEDs"), etc.).

Communication interface 360 may include any transceiver-like component, such as a transceiver and/or a separate receiver and transmitter, that enables device 300 to communicate with other devices and/or systems, such as via a wired connection, a wireless connection, or a combination of wired and wireless connections. For example, communication interface 360 may include a component for communicating with another device and/or system via a network. Additionally, or alternatively, communication interface 360 may include a logical component with input and output ports, input and output systems, and/or other input and output components that facilitate the transmission of data to and/or from another device, such as an Ethernet interface, an optical interface, a coaxial interface, an infrared interface, a radio frequency ("RF") interface, a universal serial bus ("USB") interface, or the like.

Device 300 may perform one or more processes described herein. Device 300 may perform these processes in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes that are described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
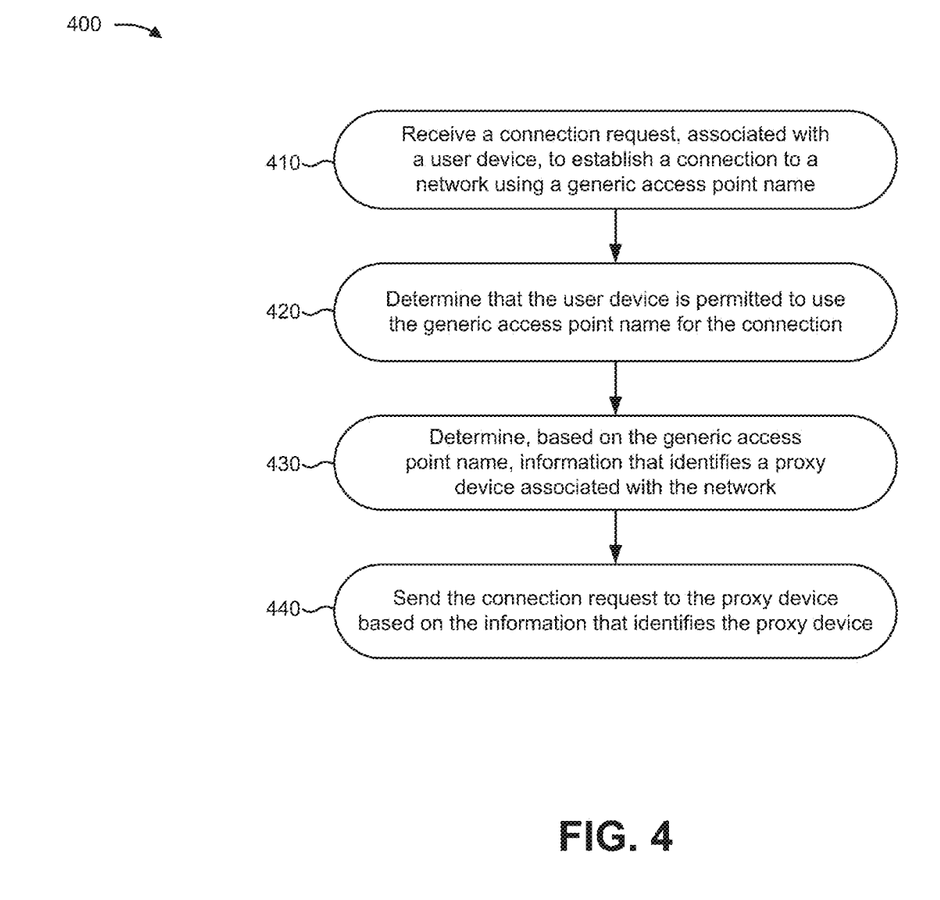
FIG. 4 is a diagram of an example process for determining information identifying a proxy device, associated with a user device, based on a generic access point name.

FIG. 4 is a diagram of an example process 400 for determining information identifying a proxy device, associated with a user device, based on a generic access point name. In some implementations, one or more process blocks of FIG. 4 may be performed by serving node 230. In some implementations, one or more process blocks of FIG. 4 may be performed by another device or a group of devices separate from or including serving node 230, such as home subscriber device 240, DNS server 250, and/or proxy device 260.

As shown in FIG. 4, process 400 may include receiving a connection request, associated with a user device, to establish a connection to a network using a generic access point name (block 410). For example, serving node 230 may receive a connection request, associated with user device 210, to establish a connection between user device 210 and third party network 290. In some implementations, serving node 230 may receive the connection request from a device associated with radio access network 220.

In some implementations, the connection request may include a generic APN associated with user device 210, proxy device 260, and/or third party network 290. A generic APN may include an APN (e.g., a non-specific APN) used to identify proxy device 260. In some implementations, the generic APN may not identify a particular gateway node 280 that is to process traffic associated with user device 210. In some implementations, the same generic APN may be stored by multiple user devices 210, and may be used downstream (e.g., by serving node 230) to identify a particular proxy device 260 responsible for determining a specific APN that identifies a gateway node 280 for processing traffic associated with a particular user device 210.

In some implementations, the connection request may include information associated with user device 210, such as a user device identifier (e.g., a string of characters, an international mobile subscriber identity ("IMSI"), a mobile subscriber integrated services digital network number ("MSISDN"), a mobile directory number ("MDN"), etc.) that identifies user device 210 associated with the connection request.

As further shown in FIG. 4, process 400 may include determining that the user device is permitted to use the generic access point name for the connection (block 420). For example, serving node 230 may determine that user device 210 is permitted to use the generic access point name for the connection with third party network 290. In some implementations, serving node 230 may receive the connection request, including the generic APN, and may send information included in the connection request (e.g., the generic APN, the user device identifier, etc.) to a device associated with managing and/or storing subscription information associated with user device 210, such as home subscriber device 240. In some implementations, home subscriber device 240 may determine, based on information stored by home subscriber device 240, that user device 210 is permitted to use the generic APN, and home subscriber device 240 may provide information, to serving node 230, indicating that user device 210 may use the generic APN.

In some implementations, home subscriber device 240 may receive the information associated with the connection request, and may provide a virtual APN to be used in place of the generic APN. For example, home subscriber device 240 may receive the generic APN associated with user device 210, and may determine (e.g., based on information stored by home subscriber device 240) a virtual APN that is to be used in place of the generic APN. A virtual APN may include an access point name that identifies a virtual access point (e.g., a secondary access point within a physical access point) that may be used, by user device 210, to connect to third party network 290. In some implementations, the virtual APN may be used to identify proxy device 260.

As further shown in FIG. 4, process 400 may include determining, based on the generic access point name, information that identifies a proxy device associated with the network (block 430). For example, serving node 230 may determine, based on the generic APN included in the connection request associated with user device 210, information that identifies proxy device 260 associated with the connection to third party network 290. In some implementations, serving node 230 may determine the information identifying proxy device 260 when serving node 230 receives, from home subscriber device 240, the information indicating that user device 210 is permitted to use the generic APN included in the connection request. Additionally, or alternatively, serving node 230 may determine the information that identifies proxy device 260 when serving node 230 receives the virtual APN from home subscriber device 240. Additionally, or alternatively, serving node 230 may determine the information that identifies proxy device 260 when serving node 230 receives an indication (e.g., from a device associated with serving node 230 and/or third party network 290) that a connection between user device 210 and third party network 290 is to be established.

In some implementations, serving node 230 may determine the information that identifies proxy device 260 based on the generic APN received from user device 210. For example, serving node 230 may send the generic APN to a device associated with maintaining and/or storing information that corresponds to the generic APN (e.g., information that identifies proxy device 260 that is to process traffic associated with the generic APN), such as DNS server 250. DNS server 250 may determine the information that identifies proxy device 260 (e.g., an internet protocol ("IP") address, a network address of proxy device 260, a string of characters that identifies proxy device 260, etc.), stored by DNS server 250, based on the generic APN, and DNS server 250 may send the information that identifies proxy device 260 to serving node 230. Serving node 230 may determine the information that identifies proxy device 260 based on receiving the information that identifies proxy device 260 from DNS server 250.

As further shown in FIG. 4, process 400 may include sending the connection request to the proxy device based on the information that identifies the proxy device (block 440). For example, serving node 230 may send the connection request, associated with user device 210, to proxy device 260 based on the information (e.g., a network address, a proxy device identifier, etc.) that identifies proxy device 260. In some implementations, serving node 230 may send the connection request to proxy device 260 when serving node 230 receives, from DNS server 250, the information that identifies proxy device 260. Additionally, or alternatively, serving node 230 may send the connection request to proxy device 260 when serving node 230 receives, from a device associated with serving node 230 and/or third party network 290, an indication that the connection between user device 210 and third party network 290 is to be established.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5:
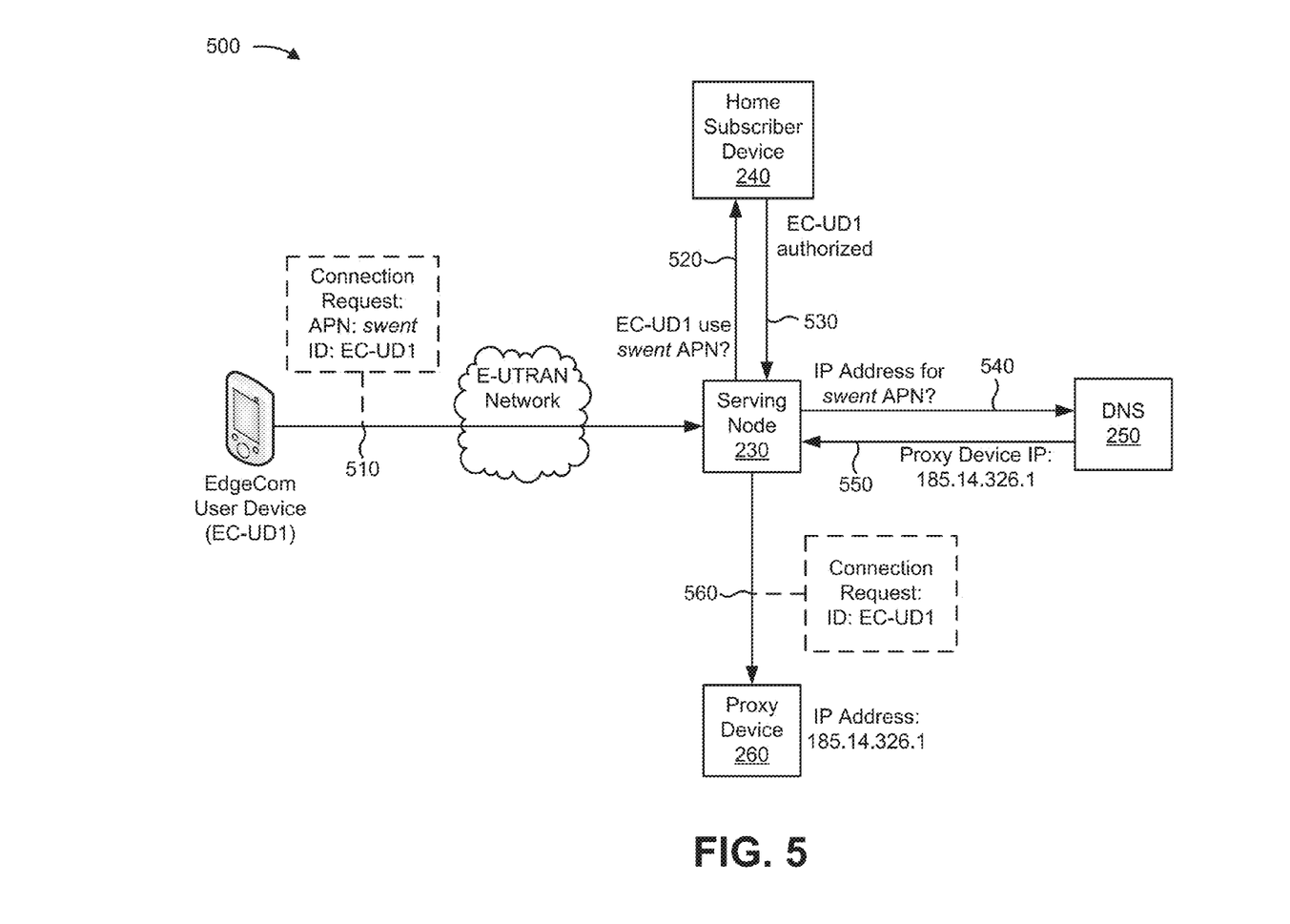
FIG. 5 is a diagram of an example implementation relating to the example process shown in FIG. 4.

FIG. 5 is a diagram of an example implementation 500 relating to example process 400 shown in FIG. 4. For the purpose of example implementation 500, assume that a user device, EC-UD1, is attempting to connect to a third party network, EdgeCom Enterprise Network (not pictured), using a generic access point name, swent.

As shown by FIG. 5, and by reference number 510, EC-UD1 may send a connection request, via an E-UTRAN network, to serving node 230. As shown, the connection request may include information that identifies the generic APN (e.g., swent), and may include information that identifies EC-UD1 (e.g., EC-UD1). As shown by reference number 520, serving node 230 may send the information identifying the generic APN to home subscriber device 240, and may query whether EC-UD1 is permitted to use the swent APN. As shown by reference number 530, home subscriber device 240 may determine (e.g., based on the information identifying EC-UD1 and the generic APN) that EC-UD1 is authorized to use the swent APN, and may provide information, indicating that EC-UD1 is authorized to use the swent APN, to serving node 230.

As shown by reference number 540, serving node 230 may receive the information indicating that EC-UD1 is permitted to use the swent APN, and may request, from DNS server 250, information identifying a proxy device 260 associated with the swent APN. As shown by reference number 550, DNS server 250 may determine, based on the swent APN, a network address of 185.14.326.1 associated with proxy device 260 that is to process traffic associated with EC-UD1, and may provide the network address to serving node 230.

As shown by reference number 560, serving node 230 may send the connection request, associated with EC-UD1, to proxy device 260 based on the information (e.g., the IP address) that identifies proxy device 260.

As indicated above, FIG. 5 is provided merely as an example. Other examples are possible and may differ from what was described with regard to FIG. 5.

Figure 6:
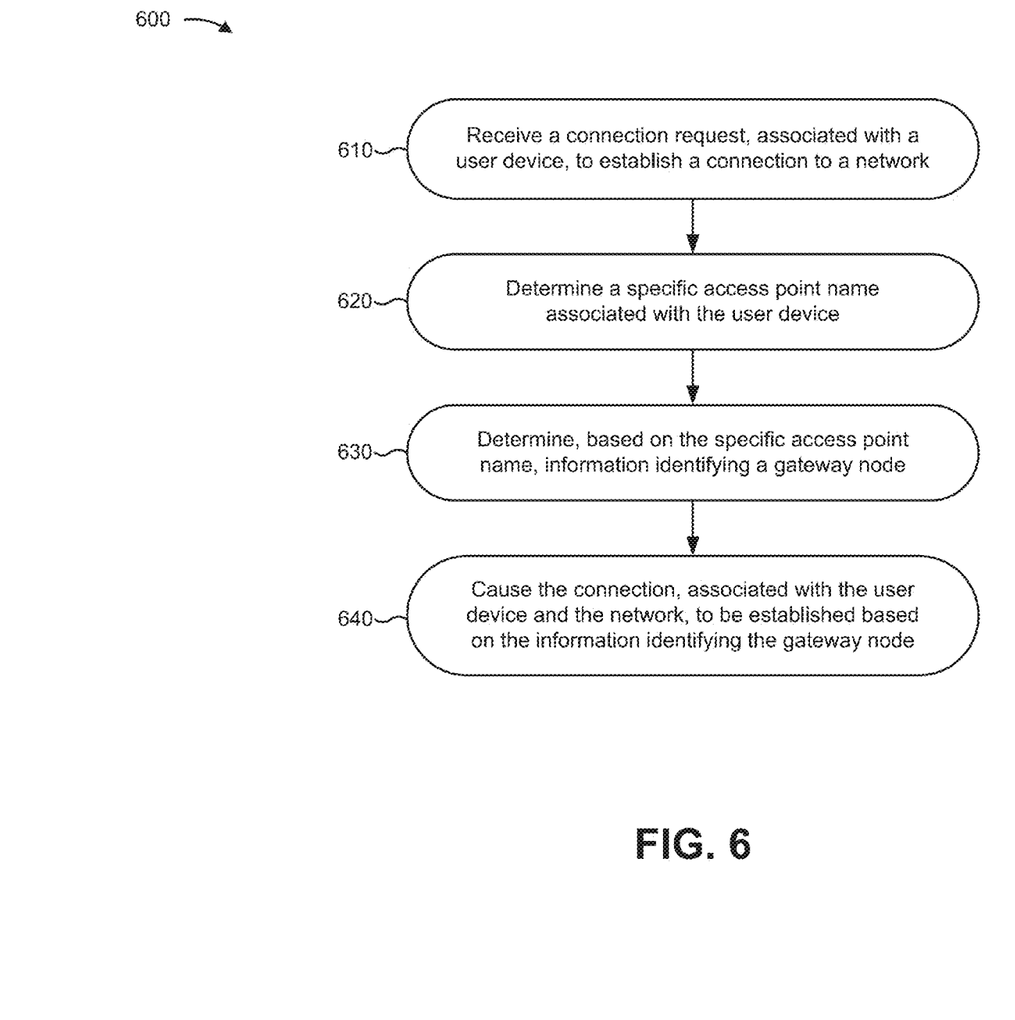
FIG. 6 is a flow chart of an example process for identifying a specific access point name, associated with the user device, and identifying a gateway node based on the specific access point name.

FIG. 6 is a flow chart of an example process 600 for identifying a specific access point name, associated with the user device, and identifying a gateway node based on the specific access point name. In some implementations, one or more process blocks of FIG. 6 may be performed by proxy device 260. In some implementations, one or more process blocks of FIG. 6 may be performed by another device or a group of devices separate from or including proxy device 260, such as serving node 230, DNS server 250, AAA server 270, and/or gateway node 280.

As shown in FIG. 6, process 600 may include receiving a connection request, associated with a user device, to establish a connection to a network (block 610). For example, proxy device 260 may receive a connection request, associated with user device 210, to establish a connection between user device 210 and third party network 290. In some implementations, proxy device 260 may receive the connection request from serving node 230. In some implementations, as discussed herein in connection with FIG. 4, proxy device 260 may receive the connection request based on information included in the connection request (e.g., a generic and/or virtual APN associated with proxy device 260). In some implementations, the connection request may include information associated with user device 210, such as a user device identifier (e.g., a string of characters, an IMSI, an MSISDN, an MDN, etc.) that identifies a user device 210 associated with the connection request.

As further shown in FIG. 6, process 600 may include determining a specific access point name associated with the user device (block 620). For example, proxy device 260 may determine a specific APN, associated with user device 210, based on the connection request associated with a connection between user device 210 and third party network 290. In some implementations, proxy device 260 may determine the specific APN when proxy device 260 receives the connection request from serving node 230. Additionally, or alternatively, proxy device 260 may determine the specific APN when proxy device 260 receives an indication (e.g., from a device associated with serving node 230 and/or third party network 290) that a connection between user device 210 and third party network 290 is to be established.

A specific APN may include an APN (e.g., a non-generic APN) associated with user device 210, gateway node 280, and/or third party network 290. For example, the specific APN may include an APN used to identify a particular gateway node 280 that is to process traffic associated with a particular user device 210.

In some implementations, proxy device 260 may determine the specific APN based on information included in the connection request received from serving node 230. For example, the connection request may include a user device identifier (e.g., a string of characters, an IMSI, an MSISDN, an MDN, etc.) that identifies user device 210, and proxy device 260 may send the user device identifier to a device associated with maintaining and/or storing subscriber information, such as AAA server 270. AAA server 270 may determine the specific APN (e.g., a specific APN that user device 210 is permitted to use) based on subscriber information, associated with user device 210, stored by AAA server 270, and AAA server 270 may send information identifying the specific APN to proxy device 260. Proxy device 260 may determine the specific APN based on receiving the information identifying the specific APN from AAA server 270.

As further shown in FIG. 6, process 600 may include determining, based on the specific access point name, information identifying a gateway node (block 630). For example, proxy device 260 may determine information identifying gateway node 280 based on the specific APN received from AAA server 270. In some implementations, proxy device 260 may determine the information identifying gateway node 280 when proxy device 260 receives the specific APN from AAA server 270. Additionally, or alternatively, proxy device 260 may determine the information identifying gateway node 280 when proxy device 260 receives an indication (e.g., from a device associated with serving node 230 and/or third party network 290) that a connection between user device 210 and third party network 290 is to be established.

In some implementations, proxy device 260 may determine the information identifying gateway node 280 based on the specific APN received from AAA server 270. For example, proxy device 260 may send the specific APN to a device associated with maintaining and/or storing information that corresponds to the specific APN (e.g., information identifying gateway node 280 assigned to process traffic associated with the specific APN), such as DNS server 250. DNS server 250 may determine the information identifying gateway node 280 (e.g., an internet protocol ("IP") address, a network address of gateway node 280, a string of characters identifying gateway node 280, etc.), stored by DNS server 250, based on the specific APN, and DNS server 250 may send the information identifying gateway node 280 to proxy device 260. Proxy device 260 may determine the information identifying gateway node 280 based on receiving the information identifying gateway node 280 from DNS server 250.

As further shown in FIG. 6, process 600 may include causing the connection, associated with the user device and the network, to be established based on the information identifying the gateway node (block 640). For example, proxy device 260 may cause the connection, between user device 210 and third party network 290, to be established based on the information identifying gateway node 280.

In some implementations, proxy device 260 may provide, to gateway node 280, information identifying user device 210 (e.g., an IMSI, an MSISDN, and MDN, etc.), the specific APN associated with user device 210, and/or information identifying serving node 230 (e.g., a tunnel endpoint identifier), and gateway node 280 may establish the connection. In some implementations, proxy device 260 may receive a response from gateway node 280 that includes information associated with establishing the connection, and proxy device 260 may forward the response to another device (e.g., serving node 230) associated with establishing the connection.

In some implementations, proxy device 260 may determine and/or provide information (e.g., a tunnel endpoint identifier), identifying serving node 230 and/or gateway node 280, that may be used to establish the connection and route traffic between serving node 230 and gateway node 280 without further assistance from proxy device 260 (e.g., such that a tunnel is formed between serving node 230 and gateway node 280).

In this way, different user devices 210 may store a generic APN, and the generic APN may be used to determine different specific APNs (e.g., a specific APN associated with each user device 210). Each specific APN may be used when establishing a connection (e.g., a connection between a user device 210 and a third party network 290) via a different gateway node 280 (e.g., where each specific APN corresponds to a different gateway node 280).

Although FIG. 6 shows example blocks of process 600, in some implementations, process 600 may include additional blocks, different blocks, fewer blocks, or differently arranged blocks than those depicted in FIG. 6. Additionally, or alternatively, two or more of the blocks of process 600 may be performed in parallel.

Figure 7:
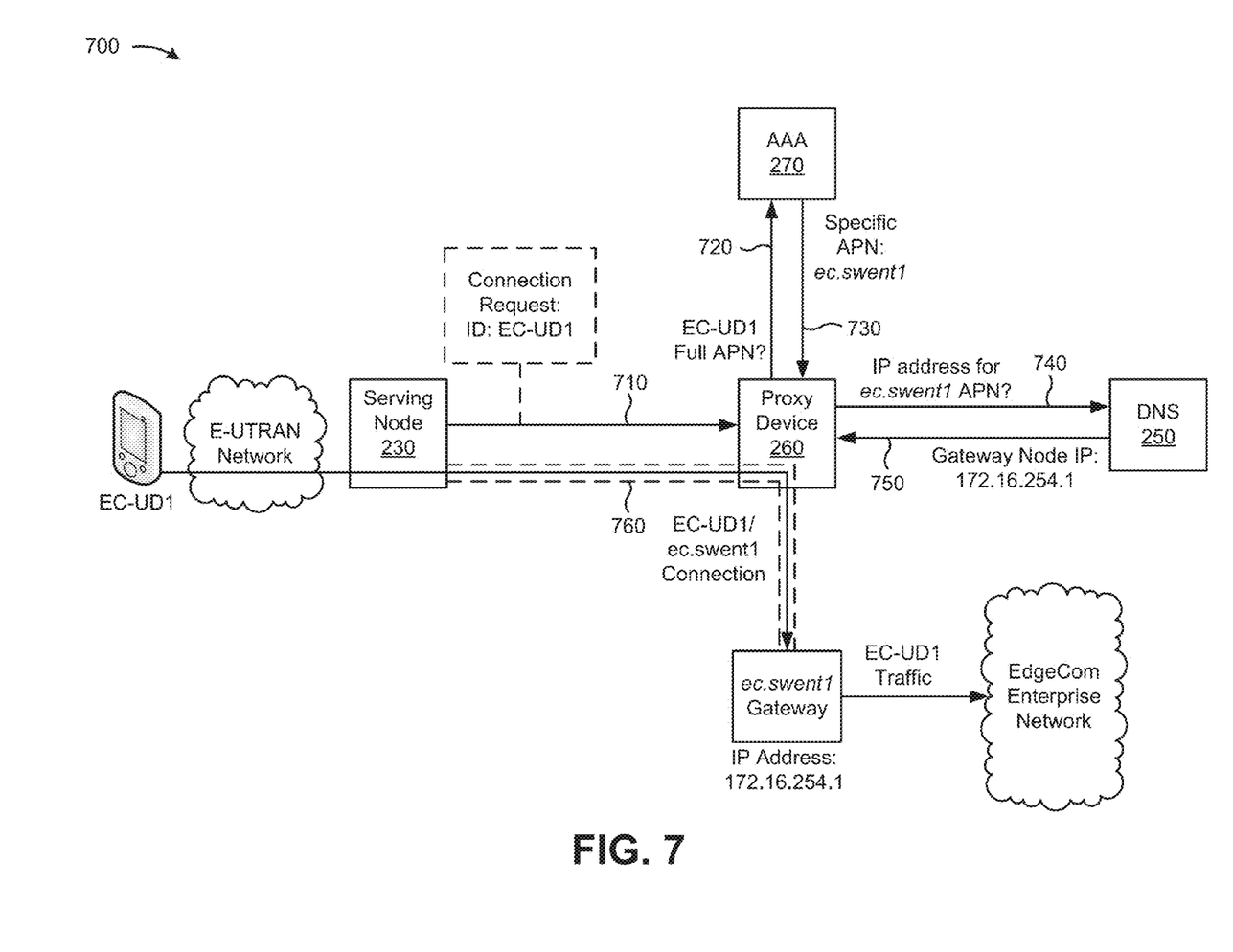
FIG. 7 is a diagram of an example implementation relating to the example process shown in FIG. 6.

FIG. 7 is a diagram of an example implementation 700 relating to example process 600 shown in FIG. 6. For the purpose of example implementation 700, assume that a user device, identified as EC-UD1, wishes to connect to a third party network, identified as EdgeCom Enterprise Network, associated with EC-UD1. Further, assume that EC-UD1 has provided a generic APN, swent, to serving node 230. Finally, assume that serving node 230 has determined, based on the swent APN and information that identifies EC-UD1, information that identifies proxy device 260 (e.g., an IP address), and that serving node 230 has sent the connection request to proxy device 260.

As shown by reference number 710, proxy device 260 may receive the connection request from serving node 230. As shown, the connection request may include a user device identifier, EC-UD1, associated with EC-UD1. As shown by reference number 720, proxy device 260 may send the information identifying EC-UD1 to AAA server 270, and may request a specific APN associated with EC-UD1. As shown by reference number 730, AAA server 270 may determine (e.g., based on the information identifying EC- UD1) the specific APN associated with EC-UD1, ec.swent1, and may provide information identifying the ec.swent1 APN to proxy device 260.

As shown by reference number 740, proxy device 260 may receive the information identifying the ec.swent1 APN, and may request, from DNS server 250, information identifying a gateway node 280 associated with the ec.swent1 APN. As shown, DNS server 250 may determine, based on the ec.swent1 APN, a network address of 172.16.254.1 associated with an ec.swent1 gateway node that is to process traffic associated with EC-UD1, and may provide the network address to proxy device 260.

As further shown in FIG. 7, and by reference number 760, proxy device 260 may cause the connection, associated with EC-UD1 and the EdgeCom Enterprise Network, to be established via the ec.swent1 gateway node. As shown, proxy device 260 may cause a tunnel to be established between serving node 230 and the ec.swent1 gateway node (e.g., by determining and providing tunnel endpoint identifiers associated with serving node 230 and the ec.swent1 gateway node). As shown, EC-UD1 may communicate with the EdgeCom Enterprise Network via serving node 230, proxy device 260, and/or the ec.swent1 gateway node. While shown as being routed through proxy device 260, traffic may be routed between serving node 230 and the ec.swent1 gateway node by means of another route that does not include proxy device 260 (e.g., via a tunnel).

As indicated above, FIG. 7 provided merely as an example. Other examples are possible and may differ from what was described with regard to FIG. 7.

Figure 8:
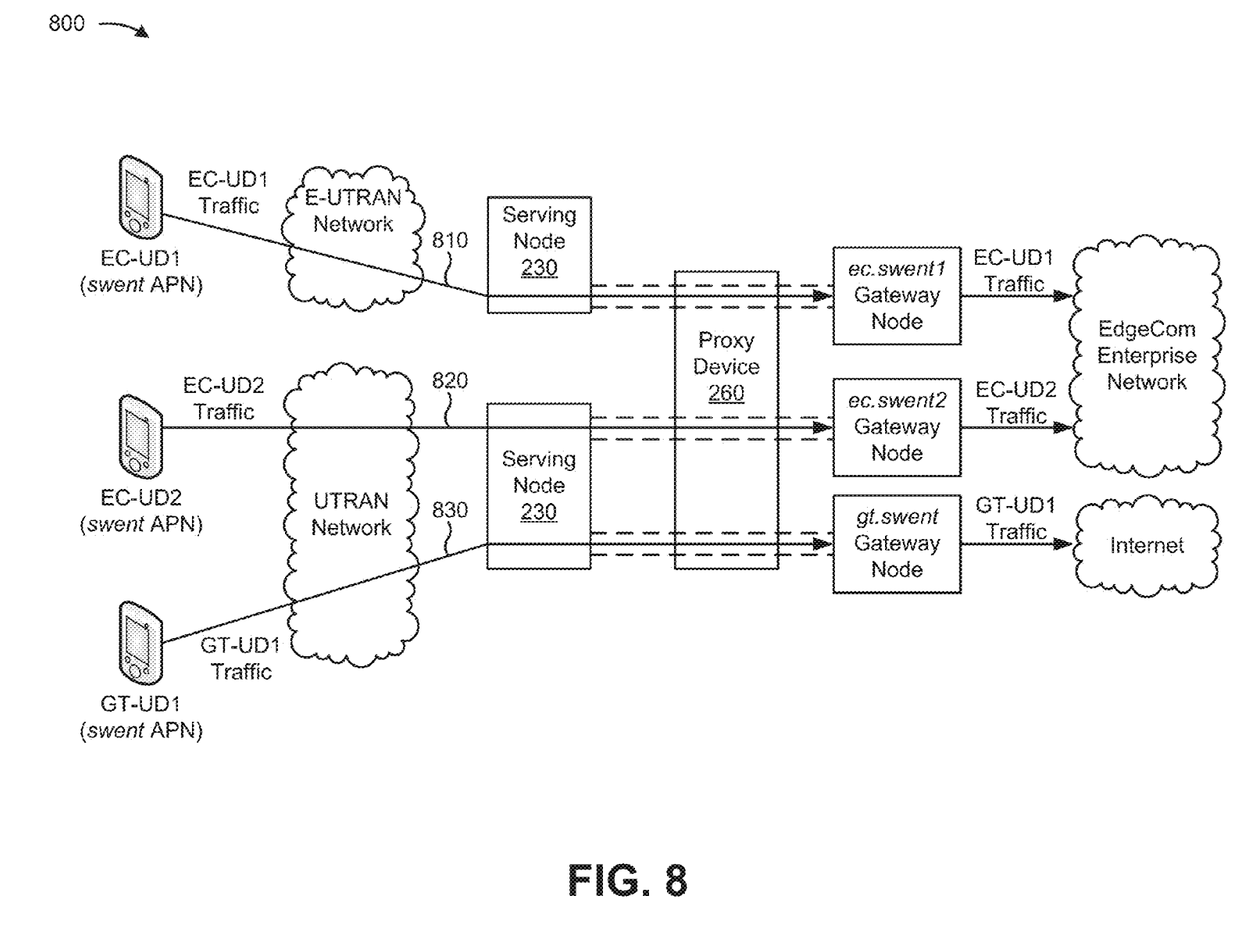
FIG. 8 is a diagram of an additional example implementation relating to the example process shown in FIG. 6.

FIG. 8 is a diagram of an additional example implementation 800 relating to example process 600 shown in FIG. 6. For the purpose of example implementation 800, assume that a connection, between user device EC-UD1 and an EdgeCom Enterprise Network, has been established using a generic APN, swent. Further, assume that a connection, between user device EC-UD2 and the EdgeCom Enterprise Network, has been established using the same generic APN, swent. Finally, assume that a connection, between GT-UD1 and the Internet, has been established using the same generic APN, swent.

As shown by reference number 810, EC-UD1 may send traffic, destined for the EdgeCom Enterprise Network (e.g., via an E-UTRAN network, a first serving node 230, and a proxy device 260) to an ec.swent1 gateway node. The ec.swent1 gateway node may process the traffic, associated with EC-UD1, and may forward the traffic to the EdgeCom Enterprise Network.

As shown by reference number 820, EC-UD2 may send traffic, destined for the EdgeCom Enterprise Network (e.g., via a UTRAN network, a second serving node 230, and proxy device 260), to an ec.swent2 gateway node. The ec.swent2 gateway node may process the traffic, associated with EC-UD2, and may forward the traffic to the EdgeCom Enterprise Network. In this way, a service provider may handle traffic associated with EC-UD1 (e.g., handled via the ec.swent1 gateway node) in a different manner than traffic associated with EC-UD2 (e.g., handled via the ec.swent2 gateway node). For example, traffic associated with EC-UD1 may be billed differently and/or provided with a different quality of service level than traffic associated with EC-UD2.

As shown by reference number 830, GT-UD1 may send traffic, destined for the Internet (e.g., via a UTRAN network, the second serving node 230, and proxy device 260), to a gt.swent gateway node. The gt.swent gateway node may process the traffic, associated with GT-UD1, and may forward the traffic to the Internet. In this way, a service provider may route traffic associated with EC-UD2 (e.g., routed to the EdgeCom Enterprise Network via the ec.swent2 gateway node) in a different manner than traffic associated with GT-UD1 (e.g., routed to the Internet via the gt.swent gateway node).

In this manner, the same generic APN (e.g., swent) may be used by different user devices (e.g., EC-UD1, EC-UD2, GT-UD1) when connecting to different third party networks (e.g., EdgeCom Enterprise Network, the Internet), via different gateway nodes (e.g., ec.swent1, ec.swent2, gt.swent) associated with each user device. Traffic associated with each user device may be routed to each gateway node using a single proxy device 260.

As indicated above, FIG. 8 is provided merely as an example. Other examples are possible and may differ from what was described with regard to FIG. 8.

Implementations described herein may allow a user device to connect to a gateway node (e.g., a node that processes user device traffic), using a generic APN, without the need to rely on the user device to store information identifying a specific APN associated with the gateway node. In this way, a user device may communicate with a third party network based on a generic APN (e.g., without relying on the user device to provide specific APN information).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

It will be apparent that systems and/or methods, as described herein, may be implemented in many different forms of software, firmware, and hardware in the implementations shown in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A system, comprising:
one or more devices to:
receive a request to establish a network connection,
the request being provided by a user device,
the request including a user device identifier that identifies the user device, and
the request including a generic access point name that is stored by a plurality of user devices,
the generic access point name corresponding to a proxy device associated with routing traffic associated with the user device, and
the plurality of user devices including the user device;
determine, based on receiving the request, that the user device is permitted to use the generic access point name in order to establish the network connection via the proxy device;
receive, based on the user device identifier, a specific access point name to be used by the user device,
the specific access point name being different from the generic access point name,
the specific access point name being received from an authorization server rather than being received from the user device, and
the specific access point name corresponding to a gateway node, of a plurality of gateway nodes, that is to apply a treatment to the traffic associated with the user device,
the treatment including at least one of:
a quality of service level,
a billing treatment, or
a treatment associated with accessing a network;
determine, based on the specific access point name, information that identifies the gateway node that is to apply the treatment to the traffic associated with the user device,
the plurality of gateway nodes being associated with a corresponding plurality of treatments,
the treatment being one of the plurality of treatments; and
cause the network connection to be established, via the proxy device, based on the user device identifier and the information that identifies the gateway node,
the network connection being established causing the proxy device to route the traffic associated with the user device to the gateway node, and causing the gateway node to apply the treatment to the traffic associated with the user device.

2. The system of claim 1, where the one or more devices, when receiving the request, are to:
receive the request from a serving node based on the generic access point name.

3. The system of claim 1, where the one or more devices, when receiving the specific access point name, are to:
provide the user device identifier to the authorization server; and
receive, from the authorization server, information that identifies the specific access point name based on a comparison of the user device identifier to information stored in a data structure that stores information identifying the user device identifier and the specific access point name.

4. The system of claim 3, where the one or more devices, when determining the information that identifies the gateway node, are to:
provide the information that identifies the specific access point name; and
receive the information that identifies the gateway node based on a comparison of the specific access point name to information stored in a data structure that stores information identifying the specific access point name and the gateway node.

5. The system of claim 1, where the one or more devices, when causing the network connection to be established, are to:
provide the user device identifier to a network device associated with establishing the network connection;
provide the information that identifies the gateway node to the network device associated with establishing the network connection; and
cause the network connection to be established based on providing the user device identifier and providing the information that identifies the gateway node.

6. The system of claim 1, where:
the user device is a first user device;
the request is a first request;
the network connection is a first network connection;
the user device identifier is a first user device identifier;
the specific access point name is a first specific access point name;
the treatment is a first treatment;
the gateway node is a first gateway node; and
where the one or more devices are further to:
receive, based on the generic access point name stored by a second user device, a second request to establish a second network connection,
the second request including a second user device identifier that identifies the second user device;
receive, based on the second user device identifier, a second specific access point name associated with the second user device,
the second specific access point name being different from the generic access point name and being different from the first specific access point name,
the second specific access point name being received from the authorization server rather than being received from the second user device, and
the second specific access point name being associated with a second treatment, of the plurality of treatments, that is to be applied to traffic associated with the second user device,
the second treatment being different from the first treatment;
determine, based on the second specific access point name, information that identifies a second gateway node, of the plurality of gateway nodes, for processing traffic associated with the second user device; and
cause the second network connection to be established based on the second user device identifier and the information that identifies the second gateway node,
the second network connection being established to allow the second treatment to be applied to the traffic associated with the second user device.

7. The system of claim 6, where the first gateway node is to at least one of:

route the traffic, associated with the first user device, to a different network than a network to which the second gateway node routes the traffic associated with the second user device; or provide a different quality of service level to the traffic, associated with the first user device, than a quality of service level that the second gateway node provides to the traffic associated with the second user device.

8. A method, comprising:
receiving, by a device, a request to process traffic associated with a user device,
the request being provided by the user device,
the request including a generic access point name being stored by a plurality of user devices,
the plurality of user devices including the user device, and
the generic access point name corresponding to a proxy device associated with routing traffic associated with the user device, and
the request including a user device identifier that identifies the user device;
determining, by the device and based on receiving the request, that the user device is permitted to use the generic access point name in order to establish a network connection via the proxy device;
identifying, by the device and using the user device identifier, a specific access point name to be used by the user device,
the specific access point name being different from the generic access point name and not identifying the user device,
the specific access point name being received from an authorization server rather than being received from the user device, and
the specific access point name corresponding to a gateway node, of a plurality of gateway nodes, that is to apply a treatment to the traffic associated with the user device,
the treatment including at least one of:
a quality of service level,
a billing treatment, or
a treatment associated with accessing a network;
determining, by the device and using the specific access point name, a gateway node identifier that identifies the gateway node that is to apply the treatment to the traffic associated with the user device,
the plurality of gateway nodes being associated with a corresponding plurality of treatments,
the treatment being one of the plurality of treatments; and
causing, by the device and based on the gateway node identifier, the traffic associated with the user device to be processed by the gateway node,
the traffic being routed via the proxy device to the gateway node,
the traffic, associated with the user device, being processed by the gateway node such that the gateway node to applies the treatment to the traffic associated with the user device.

9. The method of claim 8, where receiving the request comprises:
receiving the request from a serving node based on the generic access point name.

10. The method of claim 8, where receiving the specific access point name comprises:
providing the user device identifier to the authorization server; and
receiving, from the authorization server, the specific access point name based on a comparison of the user device identifier to information stored in a data structure that stores the user device identifier and the specific access point name.

11. The method of claim 8, where determining the gateway node identifier comprises:
providing the specific access point name; and
receiving the gateway node identifier based on a comparison of the specific access point name to information stored in a data structure that stores the specific access point name and the gateway node identifier.

12. The method of claim 8, where causing the traffic associated with the user device to be processed comprises:
providing the user device identifier to the gateway node;
providing the gateway node identifier to the user device; and
causing a connection to be established based on providing the user device identifier and the gateway node identifier.

13. The method of claim 8, where:
the user device is a first user device;
the user device identifier is a first user device identifier;
the specific access point name is a first specific access point name;
the treatment is a first treatment;
the gateway node is a first gateway node;
the gateway node identifier is a first gateway node identifier; and
where the method further comprises:
receiving, based on the generic access point name and a second user device identifier associated with a second user device, a second specific access point name,
the second specific access point name being different from the generic access point name and being different from the first specific access point name,
the second specific access point name being received from the authorization server rather than being received from the second user device, and
the second specific access point name being associated with a second treatment, of the plurality of treatments, that is to be applied to traffic associated with the second user device,
the second treatment being different from the first treatment;
determining, based on the second specific access point name, a second gateway node identifier that identifies a second gateway node, of the plurality of gateway nodes, for processing traffic associated with the second user device; and
causing, based on the second gateway node identifier, the traffic associated with the second user device to be processed by the second gateway node,
the traffic, associated with the second user device, being processed by the gateway node to allow the second treatment to be applied to the traffic associated with the second user device.

14. The method of claim 13, where the first gateway node is to at least one of:
route the traffic, associated with the first user device, to a different network than a network to which the second gateway node routes the traffic associated with the second user device; or
provide a different quality of service level to the traffic, associated with the first user device, than a quality of service level that the second gateway node provides to the traffic associated with the second user device.

15. A non-transitory computer-readable medium storing instructions, the instructions comprising:
one or more instructions that, when executed by one or more processors, cause the one or more processors to:
receive a connection request to establish a connection between a user device and a network,
the connection request being provided by the user device,
the connection request including a user device identifier that identifies the user device, and
the connection request including a generic access point name that is stored by a plurality of user devices,
the generic access point name corresponding to a proxy device associated with routing traffic associated with the user device, and
the plurality of user devices including the user device;
determine, based on receiving the connection request, that the user device is permitted to use
to use the generic access point name in order to establish the connection via the proxy device:
receive, based on the user device identifier, a specific access point name to be used by the user device,
the specific access point name being different than the generic access point name,
the specific access point name being received from an authorization server rather than being received from the user device, and
the specific access point name corresponding to a gateway node, of a plurality of gateway nodes, that is to apply a treatment to be applied to traffic associated with the user device,
the treatment including at least one of:
a quality of service level,
a billing treatment, or
a treatment associated with accessing a network;
determine, based on the specific access point name, information that identifies the gateway node that is to apply the treatment to the traffic associated with the user device,
the plurality of gateway nodes being associated with a corresponding plurality of treatments,
the treatment being one of the plurality of treatments; and
cause the connection to be established, via the proxy device, based on the user device identifier and the information that identifies the gateway node,
the connection being established causing the proxy device to route the traffic associated with the user device to the gateway node, and causing the gateway node to apply the treatment to the traffic associated with the user device.

16. The non-transitory computer-readable medium of claim 15, where the one or more instructions, that cause the one or more processors to receive the connection request, cause the one or more processors to:
receive the connection request from a serving node based on the generic access point name associated with the connection request.

17. The non-transitory computer-readable medium of claim 15, where the one or more instructions, that cause the one or more processors to receive the connection request, cause the one or more processors to:
receive the connection request from a serving node, associated with the connection request, based on a virtual access point name associated with the user device.

18. The non-transitory computer-readable medium of claim 15, where the one or more instructions, that cause the one or more processors to receive the specific access point name, cause the one or more processors to:
provide, to the authorization server, a specific access point name request for information that identifies the specific access point name,
the specific access point name request including the user device identifier;
receive, from the authorization server and based on the user device identifier, the information that identifies the specific access point name; and
receive the specific access point name based on receiving the information that identifies the specific access point name.

19. The non-transitory computer-readable medium of claim 15, where the one or more instructions, that cause the one or more processors to determine the information that identifies the gateway node, cause the one or more processors to:
send, to a device associated with storing a network address of the gateway node, a gateway node identifier request for information that identifies the gateway node,
the gateway node identifier request including the specific access point name;
receive, from the device associated with storing the network address of the gateway node and based on the specific access point name, the network address of the gateway node; and
determine the information that identifies the gateway node based on receiving the network address of the gateway node.

20. The non-transitory computer-readable medium of claim 15, where the one or more instructions, that cause the one or more processors to cause the connection to be established, cause the one or more processors to:
provide the user device identifier to a network device associated with establishing the connection;
provide the information that identifies the gateway node to the network device associated with establishing the connection; and
cause the connection to be established based on providing the user device identifier and providing the information that identifies the gateway node.

* * * * *